United States Patent
Allison et al.

[19]

[11] Patent Number: 6,003,716

[45] Date of Patent: Dec. 21, 1999

[54] DUAL OPENING CONSOLE

[75] Inventors: Johnny Hugh Allison, Plymouth Township; Gerald Arthur Heath, Canton; Richard Morabito, Grosse Isle; Jeff Hayes, Dearborn; David Norman Denomme, Dearborn Heights; Walter Andrew Hartley, Redford; Harry Craig Kuptz, Livenia, all of Mich.

[73] Assignee: Ford Motor Company, Dearborn, Mich.

[21] Appl. No.: 09/148,229

[22] Filed: Sep. 4, 1998

Related U.S. Application Data

[60] Provisional application No. 60/058,018, Sep. 5, 1997.

[51] Int. Cl.$^6$ .............................. A47B 88/00; B65D 43/18
[52] U.S. Cl. ...................... 220/326; 220/831; 220/845; 312/324; 312/235.6
[58] Field of Search .................... 220/831, 840, 220/845, 326, 324; 312/324, 235.6

[56] References Cited

U.S. PATENT DOCUMENTS

| | | |
|---|---|---|
| 2,923,429 | 2/1960 | Schneider .............................. 220/326 |
| 3,321,100 | 5/1967 | Toma . |
| 4,456,141 | 6/1984 | Pamment ................................ 220/326 |
| 4,585,139 | 4/1986 | Bronson et al. ........................ 220/326 |
| 4,589,567 | 5/1986 | Pircher .................................. 220/326 |
| 4,809,897 | 3/1989 | Wright, Jr. ............................. 224/282 |
| 4,901,882 | 2/1990 | Goncalves .............................. 220/326 |
| 4,942,271 | 7/1990 | Corsi et al. ............................. 174/101 |
| 5,067,625 | 11/1991 | Numata ................................ 220/343 |
| 5,173,992 | 12/1992 | Aihara et al. ............................ 16/232 |
| 5,210,906 | 5/1993 | Aihara et al. ............................ 16/232 |
| 5,251,775 | 10/1993 | Kruzick et al. ........................ 220/326 |
| 5,647,652 | 7/1997 | Zalewski et al. ...................... 312/324 |

FOREIGN PATENT DOCUMENTS

| | | |
|---|---|---|
| 57-198138 | 12/1982 | Japan . |
| 3189249 | 8/1991 | Japan . |

*Primary Examiner*—Joseph M. Moy
*Attorney, Agent, or Firm*—David B. Kelley

[57] ABSTRACT

A dual open console for use with a vehicle. The console includes a lock assembly that allows opening of only one side of the console at a time. The lock assembly includes a pivot bar engaging locks on both sides of the lid of the console. The pivot bar operates to ensure that the lock on one side of the lid remains engaged when the lock on the other side is released.

13 Claims, 4 Drawing Sheets

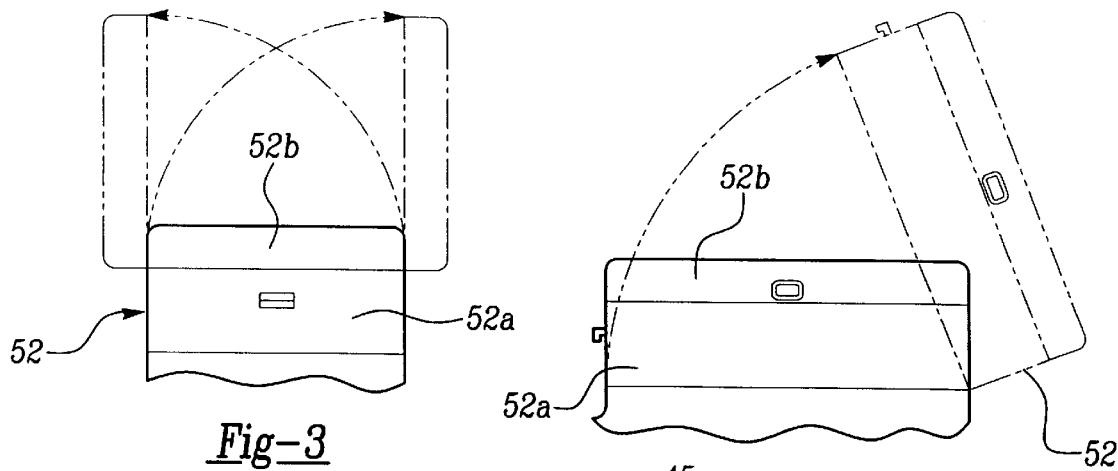
Fig-3
Fig-4
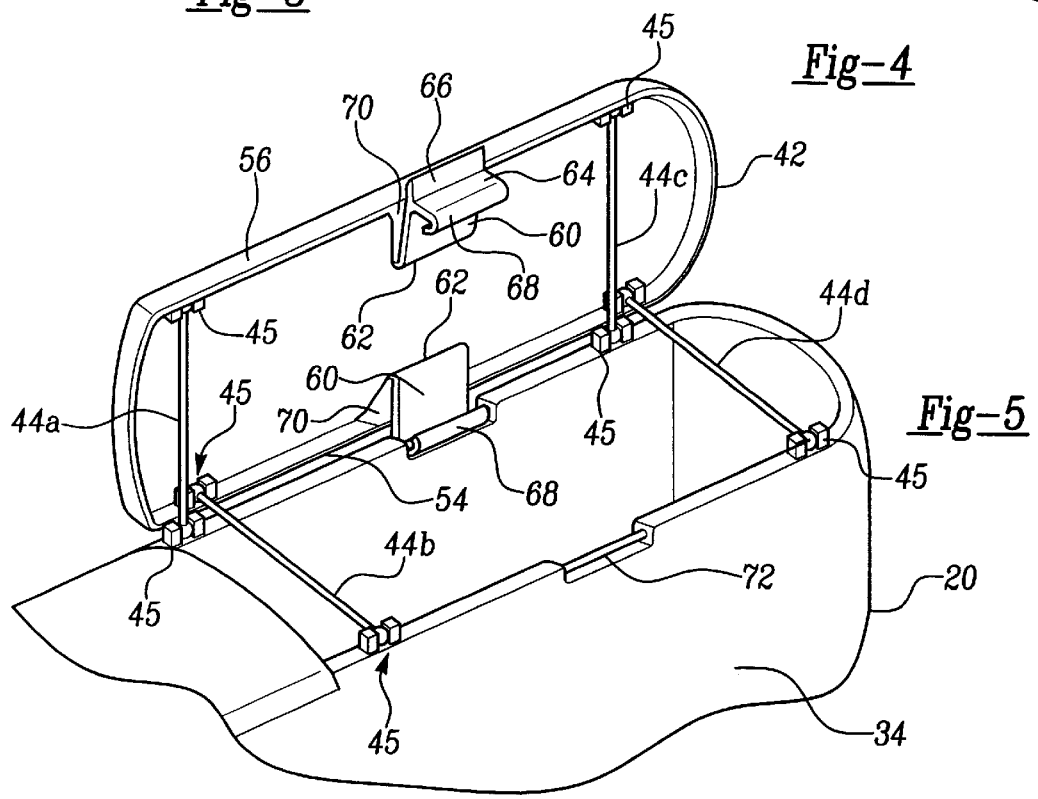
Fig-5
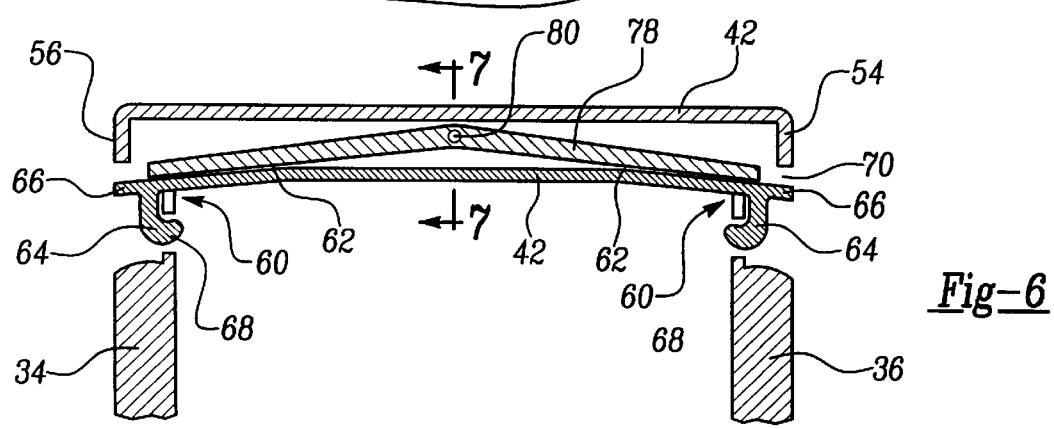
Fig-6

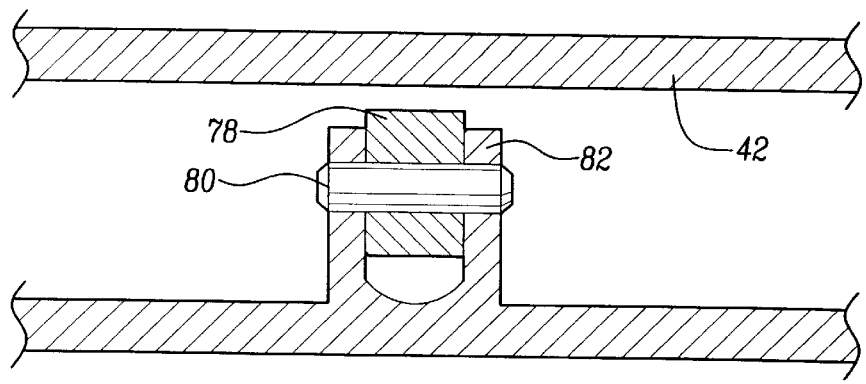
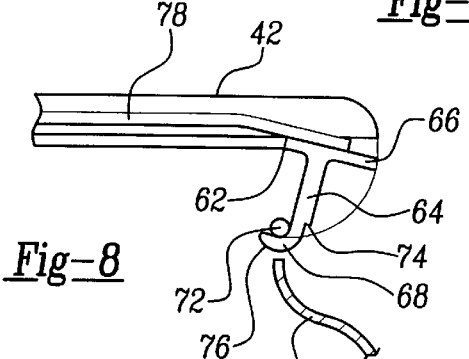
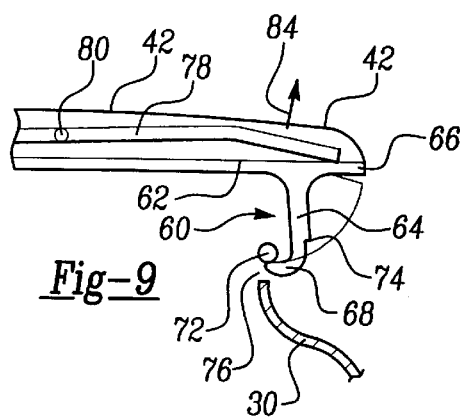
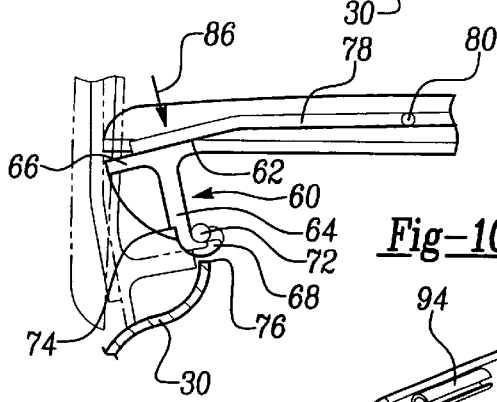
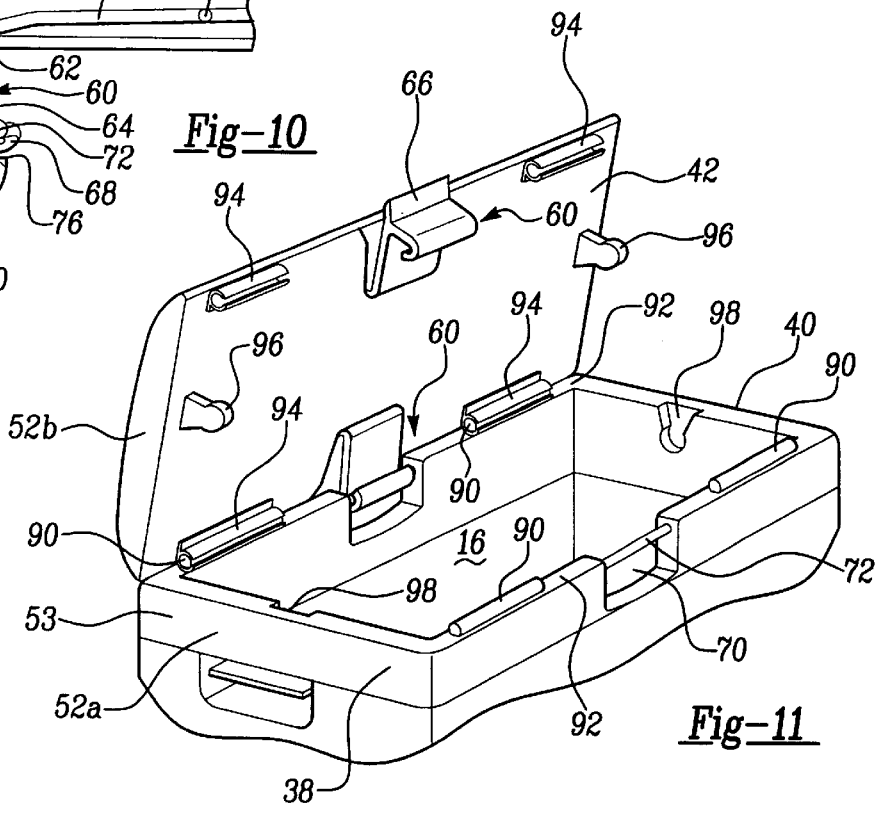

DUAL OPENING CONSOLE

The present invention claims the priority date of copending United States Provisional Patent Application Ser. No. 60/058,018 filed Sep. 5, 1997.

BACKGROUND OF THE INVENTION

1. Field of the Invention

The present invention relates generally to a console for use with a vehicle and more specifically to a console that can be opened from either side of the console.

2. Description of the Related Art

It is well known to provide a console between the driver and front passenger seats in an automotive vehicle. The console has many functions. It may operate as an arm rest, a storage unit, a writing table or cup holder. Three types of center consoles exist, those that open on one side, those that open on two sides, and those that open from the front. Each type of console has disadvantages.

Consoles that open on one side only, typically open in a manner that limits access only to the driver of the vehicle. Further, those that open on one side only are not suitable in today's global marketplace; i.e., a console suitable for a right-hand drive vehicle would not be suitable for a left-hand drive vehicle. Consoles that open from the front are not desirable. While they provide access to both the driver and the passenger in the front seat, they do not allow access to passengers sitting in the rear seats. Finally, consoles that open on two sides typically utilize a complex dual-hinge system. Such systems result in increased manufacturing costs.

Therefore, there is a need in the art for an inexpensive dual opening console that eliminates the need to design separate consoles for right-hand and left-hand drive vehicles. There is also a need in the art for a lock assembly that allows only one side of the console to open at a time.

SUMMARY OF THE INVENTION

Accordingly, the present invention is an inexpensive dual opening console having a lock assembly that allows only one side of the console to open at a time. The console includes a compartment having a bottom, a first side wall, a second side wall, a front wall, and a rear wall. A lid is pivotally connected to the compartment and can be opened from either the first and second side walls or the front and rear walls. A lock assembly attached to the lid and securing the lid to the compartment includes a pair of locks located on the lid adjacent opposite side walls or opposite end walls. The locks include downwardly extending lock arms. The lock arms include a lock foot. The lock foot has a lock lip thereon. The lock lip is operative to engage a lock pin located on the console adjacent the locks. A pivot bar attached to the lid extends longitudinally between opposite side walls or opposite end walls such that it coincides with the locks and acts on the locks to prevent both sides from opening at the same time. Thus, when one side is opened or unlocked, the opposite side remains closed or locked.

One advantage of the present invention is that it only allows one side of the console to be unlocked at a time. The lock assembly operates such that when one lock arm is lifted to open the lid, the pivot bar presses down on the opposite lock arm preventing it from opening. A further feature of the present invention is that the pivot bar is mounted inside the lid on a pivot pin such that the pivot bar pivots back and forth freely. An additional feature of the present invention is the use of molded pivot bearings on opposite side walls or opposite end walls. The pivot bearings cooperate with complementary snap pivots connected to the lid. When the compartment is opened on one side, the snap pivots on the opposite side of the lid pivot about the pivot bearings. Thus the lid can be opened and closed from either side or from the front and back of the console depending upon the position of the pivot bearings and complementary snap pivots.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is a rear view of the console, according to the present invention, illustrating the lid opening from either the left or right side.

FIG. 4 is a side view of the console, according to the present invention, illustrating the lid opening from the front.

FIG. 5 is a perspective view of the console, according to the present invention, showing locks on the right and left side of the lid.

FIG. 6 is a cross-sectional view of the console, according to the present invention, with the lid closed and locked.

FIG. 7 is a cross-sectional view of the console of FIG. 6 taken along lines 7—7.

FIG. 8 is a sectional view showing a lock arm, according to the present invention, in the closed, locked position.

FIG. 9 is a sectional view showing the lock arm, according to the present invention, pivoting free of the lock pin.

FIG. 10 is a sectional view, showing in phantom, the lock arm, according to the present invention, with the lid open.

FIG. 11 is a perspective view of an additional embodiment of the console, according to the present invention.

DESCRIPTION OF THE PREFERRED EMBODIMENT(S)

Figure 1:
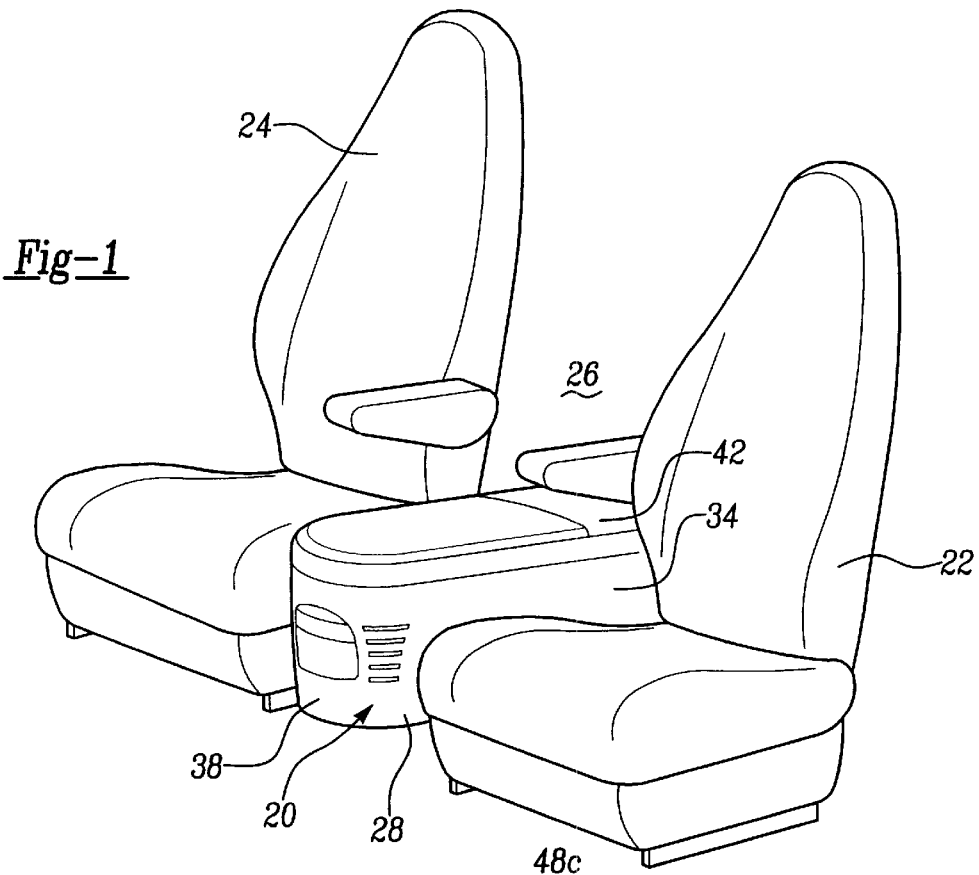
FIG. 1 is a perspective view of a console, according to the present invention, shown in use between two seats of an automotive vehicle.

Referring to FIG. 1, one embodiment of a console 20 according to the present invention is shown positioned between a driver seat 22 and a passenger seat 24. The console 20 as shown is generally elongated and rectangular in shape to fit the space 26 between the seats 22 and 24.

The console 20 includes a rectangular, elongated member 28 defining a compartment 30. As shown, the compartment 30 includes a bottom 32, a first side wall 34, a second side wall 36, a front end wall 38 and a rear end wall 40. A lid 42 is connected to the compartment 30. As will be explained later, the lid 42 may be hinged to any one of the walls; i.e., the first side wall 34, the second side wall 36, the front end wall 38 and the rear end wall 40. Attaching the lid 42 in this manner enables the lid 42 to be opened in any one of four directions, i.e., front to back or side to side, to allow access from any point adjacent the console 20.

Figure 2:
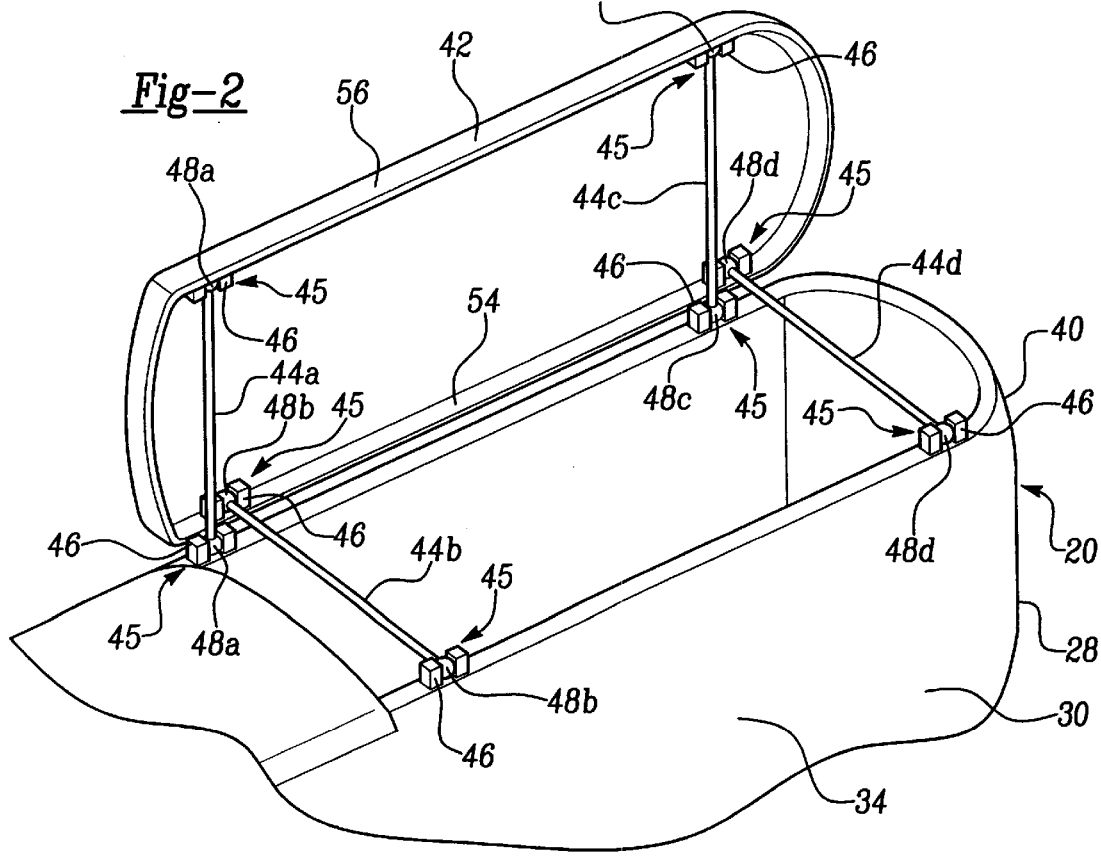
FIG. 2 is a perspective view of the console, according to the present invention, including a compartment having a lid that can be opened on either side.
Figure 12:
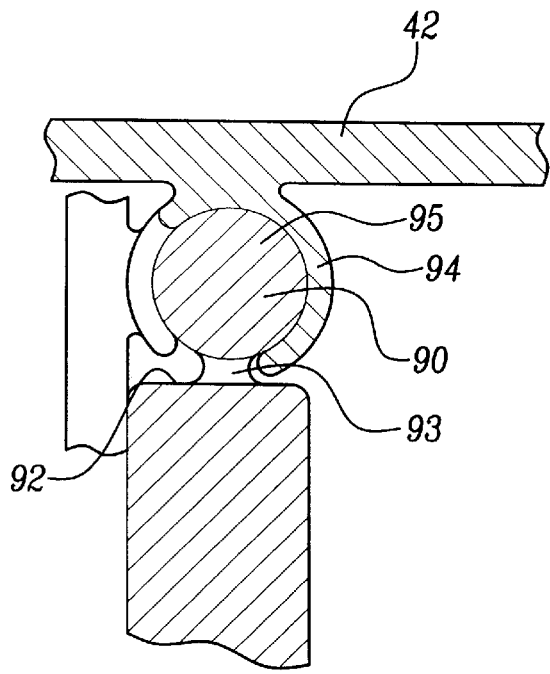
FIG. 12 is a sectional view of the embodiment shown in FIG. 11 focusing on the pivot bearing and snap pivot.
Figure 13:
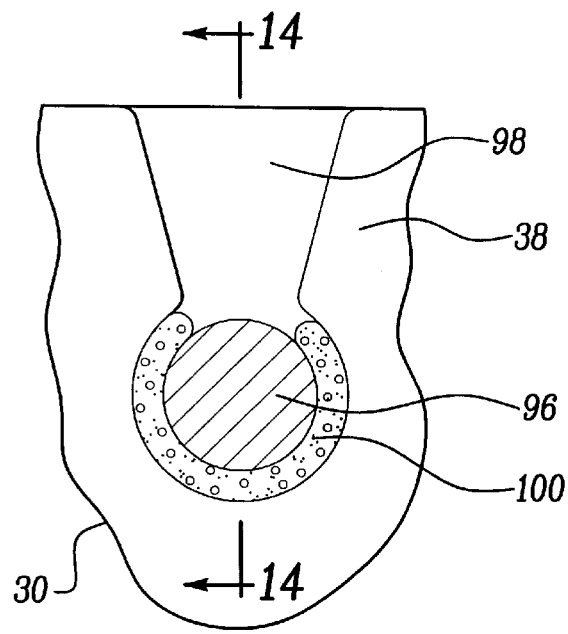
FIG. 13 is a sectional view of the embodiment shown in FIG. 11 focusing on a pin and key way.
Figure 14:
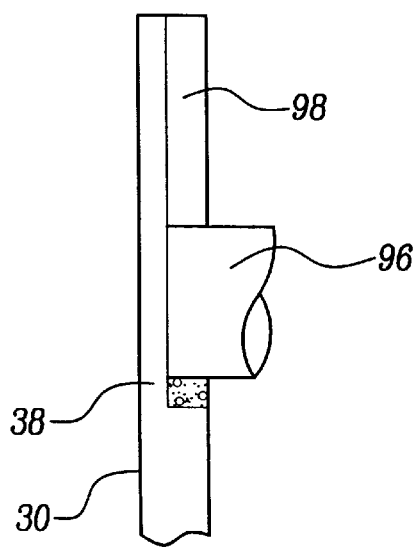
FIG. 14 is a sectional view of the embodiment shown in FIG. 13 taking along lines 14—14.

Turning to FIG. 2, the console 20 is shown with the lid 42 open to illustrate a plurality of support bars 44a–44d interconnecting the lid 42 with the compartment 30. As shown, the support bars 44a–44b are located near the front end wall 38 of the console 20 and the support bars 44c–44d are located near the rear end wall 40 of the console 20. The support bars 44a–44d operate in pairs to allow the lid 42 to open from either side. Turning to the first pair of support bars 44a–44b, the first support bar 44a is pivotally connected on one end to the second side wall 36. The opposite end is pivotally connected to the lid 42 on the left side 56, the side adjacent the first side wall 34. The support bars 44a–44d are pivotally connected at pivot points 45 using two upright projections 46 that capture the respective ends 48a–48d of the support bars 44a–44d. The manner of connecting or attaching the support bars 44a–44d to the first side wall 34 or the second side wall 36 of the console 20 and the lid 42 only requires that the connection be pivotal to allow the lid 42 to open. Other types of pivotal connections may be used and the same are well known to those skilled in the art. Support bar 44b is attached on one end to the second side wall 36 and is pivotally connected on the other end to the lid 42 on the right side 56, the side adjacent the first side wall 34. It should be appreciated that the second set of support bars 44c–44d are pivotally connected to the respective first and second side walls 34, 36 and the lid 42 in the same manner.

To open the lid to the position shown in FIG. 2, the left side 56, or edge adjacent the first side wall 34, is lifted. When the left side 56 of the lid 42 is raised, the support bars 44a and 44d turn outwardly in unison with the lid 42 about the pivot points 45 located on the second side wall 36. The ends 48b–48c of the support bars 44b–44c connected through pivot points 45 on the first side wall 34 will not turn. Instead they are held in their original, horizontal position. When the lid 42 is opened from the opposite side, i.e. the right side 54, the support bars 44b–44c turn upwardly in unison with the lid 42 at the pivot point 45 on the first side wall 34 and the support bars 44a–44d will remain in their original, horizontal position.

As shown in FIGS. 3 and 4, if the support bars 44a–44d are rotated by 90 degrees from the orientation shown in FIG. 2, the lid 42 can be opened from the front and rear end walls 38, 40. FIGS. 3 and 4 also illustrate a combination lid 52 having two lid portions, and upper portion 52a and a lower portion 52b that allow the lid 52 to open either side to side or front to back. The lower section 52a of the lid 52 is a ring shaped member 53. The ring-shaped member 53 allows access therethrough when the upper section 52b of the lid 52 is opened, as a shown in FIG. 3, to access the interior of the compartment 30.

Turning now to FIG. 5, FIG. 5 shows two locks 60 molded into the right 54 and left 56 sides of the lid 42 when viewing the console 20 from the rear. Each lock 60 includes a lock arm 64, a lift the tab 66, and a lock lip 68. The lock arm 64 pivots about the crease or mold line 62 when an upward force is applied to the lift tab 66. As an upward force is applied to the lift tab 66, the lift tab 66 is pressed into the gap or recess 70 causing the lock arm 64 to swing outward and disengage the lock lip 68 from a lock pin 72 located in the first side wall 34.

Turning now to FIGS. 6 and 7, there is shown a pivot bar 78 that cooperates with the locks 60 to prevent more than one lock 60 from being opened at a time. The pivot bar 78 is pivotally attached to the lid 42, through a pivot pin 80 extending through a u-shaped yoke 82. The u-shaped yoke 82 supports the pivot bar 78 such that it pivots or rocks back and forth freely.

FIGS. 8–10 illustrate operation of the locks 60 and pivot bar 78. FIG. 8 shows a cross section of one lock 60 in a closed, locked position. The lock lip 68 of the lock arm 64 is secured to the lock pin 72. The lock arm 64 further includes a lock shelf 74 that prevents the lock arm 64 from sliding to deeply into the slot or opening 76 adjacent the lock pin 72. As shown in FIG. 9, when an upward force is placed on the lift tab 66, it causes the lock arm 64 to pivot outwardly at the crease or mold line 62. As the lock arm 64 pivots it releases the lock lip 68 from the lock pin 72. The lid 42 may then be opened. FIG. 10 shows the opposite side of the lid 42 and corresponding lock 60 from that shown in FIGS. 8 and 9 with the opened, unlocked position shown by the dotted lines. As the lid 42 is opened, the lock lip 68 remains engaged to the lock pin 72. The lock shelf 74 prevents the lock arm 64 from sliding into the opening 76 adjacent the lock pin 72. When the lid 42 is in a fully opened position, the lift tab 66 rests against a side wall 34, 36 of the console 30. The pivot bar 78 converts the upward force in the direction shown by the arrow 84 exerted on the lift tab 66 through the pivot bar 78, and to a downward force in the direction shown on the opposite lock arm 64 to ensure that the lock lip 68 of the opposite lock arm 64 remains engaged with the lock pin 72.

Turning now to FIGS. 11–14, there is shown the lid 52 open and pivotally connected to the second side wall 36. A pivot bearing 90 is secured to an upper surface 92 of both the first side wall 34 and second side wall 36. A pair of substantially c-shaped snap pivots 94 engage the pivot bearing 90. The snap pivots 94 allow the lid 52 to open from either side. When one side is lifted, the snap pivots 94 on that side disconnect or release from the pivot bearing 90 and the snap pivots 94 on the other side remain engaged to the pivot bearing 90 on that side and allow the lid 42 to rotate about that side. At the ends of the lid 42 are tabs 96 which engage key slots 98 formed in the front and rear end walls 38 and 40 of the console 20. The tab 96 and key slot 98 combination cushions and reduces vibration when the console 30 is moved. The key slot 98 may also contain a resilient cushion or a foam lining 100 to further reduce vibration The present invention has been described in an illustrative manner. It is to be understood that the turn knowledge he which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A console for use with an automotive vehicle comprising:
   a compartment including a bottom, a first side wall, a second side wall, a front end wall, and a rear end wall;
   a lid pivotally connected to said compartment, said lid operative to open from any of said first side, second side, front end or rear end walls;
   a lock assembly connecting said lid to said compartment such that said lid opens only on one side at a time, wherein said lock assembly includes a pair of locks, said locks located on said lid between opposite side walls or end walls, a lock arm positioned on the respective ends of said locks, said lock arm including a lock lip operative to engage a lock pin positioned on said console adjacent said lock arm; and a pivot bar pivotally attached to said lid and extending longitudinally between opposite side walls, said pivot bar positioned adjacent said locks, said pivot bar operative to pivot back and forth such that when one lock is lifted the other lock is depressed allowing only one side of the console to be opened.

2. A console as set forth in claim 1 including a first support bar having one end pivotally connected to one of said first or second side walls and the other end pivotally connected to said lid adjacent an opposite wall, a second support bar extending parallel to said first support bar, one end thereof pivotally connected to said opposite wall and the opposite end thereof pivotally connected to said lid adjacent said first or second side wall.

3. A console as set forth in claim 1 including a first pivot bearing on said first side wall and a second pivot bearing located on said second side wall, a snap pivot located on each side of said lid, one of said snap pivots engaging said second pivot bearing when said lid is released from said first pivot bearing enabling said lid to pivot about said second pivot bearing.

4. A console as set forth in claim 3 wherein said pivot bearing includes a post secured to one of said walls and a substantially cylindrical member secured to said post, said substantially cylindrical member having a longitudinal axis that extends parallel to the planar axis of said one of said walls.

5. A console as set forth in claim 1 including a tab extending downward from said lid, and a key hole slot formed in one of said walls, said key hole slot receiving said tab to limit vibration between the components of the console.

6. A console as set forth in claim 5 including a cushion formed of a resilient material positioned within said key hole slot, said cushion disposed between said tab and said key hole slot to reduce vibration between the components of the console.

7. A console as set forth in claim 1 wherein said lid includes an upper portion and a lower portion, said lower portion including a ring member pivotally attached to said compartment, said upper portion pivotally attached to said lower portion such that said upper portion pivots in a direction transverse to the pivot direction of said lower portion.

8. A console as set forth in claim 7 wherein said lower portion includes a plurality of snap pivots located thereon, said snap pivots operative to engage a pivot bearing positioned on said compartment.

9. A console as set forth in claim 7 wherein said upper portion includes a plurality of snap pivots located thereon, said snap pivots operative to engage a pivot bearing positioned on said lower portion of said lid.

10. A console for use with an automotive vehicle comprising:

a compartment including a bottom, a first side wall, a second side wall, a front end wall, and a rear end wall;

a lid pivotally connected to said compartment, said lid operative to open from any of said first side, second side, front end or rear end walls;

a lock assembly connecting said lid to said compartment such that said lid opens only on one side at a time, wherein said lock assembly includes a pair of locks, said locks located on said lid between opposite side walls or end walls, a lock arm positioned on the respective ends of said locks, said lock arm including a lock lip operative to engage a lock pin positioned on said console adjacent said lock arm;

a pivot bar pivotally attached to said lid and extending longitudinally between opposite side walls, said pivot bar positioned adjacent said locks, said pivot bar operative to pivot back and forth such that when one lock is lifted the other lock is depressed allowing only one side of the console to be opened;

said lid including an upper portion and a lower portion, said lower portion including a ring member pivotally attached to said compartment, said upper portion pivotally attached to said lower portion such that said upper portion pivots in a direction transverse to the pivot direction of said lower portion; and said lower portion including a plurality of snap pivots located thereon, said snap pivots operative to engage a pivot bearing positioned on said compartment, said upper portion including a plurality of snap pivots located thereon, said snap pivots operative to engage a pivot bearing positioned on said lower portion of said lid.

11. A console for use with an automotive vehicle comprising:

a compartment including a bottom, a first side wall, a second side wall, a front end wall, and a rear end wall;

a lid pivotally connected to said compartment, said lid operative to open from any of said first side, second side, front end or rear end walls;

a lock assembly connecting said lid to said compartment such that said lid opens only on one side at a time, wherein said lock assembly includes a pair of locks, said locks located on said lid between opposite side walls or end walls, a lock arm positioned on the respective ends of said locks, said lock arm including a lock lip operative to engage a lock pin positioned on said console adjacent said lock arm;

a pivot bar pivotally connected to said lid and extending longitudinally between opposite side walls, said pivot bar positioned adjacent said locks, said pivot bar operative to pivot back and forth such that when one lock is lifted the other lock is depressed allowing only one side of the console to be opened;

a first pivot bearing on said first side wall and a second pivot bearing located on said second side wall, snap pivots located on each side of said lid, one of said snap pivots engaging said second pivot bearing when said lid is released from said first pivot bearing enabling the lid to pivot about said second pivot bearing.

12. A console as set forth in claim 11 including a tab extending downward from said lid, and a key hole slot formed in one of said walls, said key hole slot receiving said tab to limit vibration between the components of the console.

13. A console as set forth in claim 11 wherein said first and second pivot bearings each including a post secured to said first and second side walls and a substantially cylindrical member secured to said post, said substantially cylindrical member having a longitudinal axis that extends parallel to the planar axis of said first and second side walls.

* * * * *